(12) United States Patent
Kirsch et al.

(10) Patent No.: US 11,404,074 B2
(45) Date of Patent: Aug. 2, 2022

(54) METHOD FOR THE CLASSIFICATION OF TEMPORALLY SEQUENTIAL DIGITAL AUDIO DATA

(71) Applicant: Robert Bosch GmbH, Stuttgart (DE)

(72) Inventors: Andrea Kirsch, Stuttgart (DE);
Christoph Bayer, Pforzheim (DE);
Katharina Maria Radermacher, Weil der Stadt (DE); Olaf Schoenrock, Schwieberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/850,780

(22) Filed: Apr. 16, 2020

(65) Prior Publication Data
US 2020/0335123 A1    Oct. 22, 2020

(30) Foreign Application Priority Data
Apr. 17, 2019    (DE) .................... 10 2019 205 543.5

(51) Int. Cl.
*G10L 25/30* (2013.01)
*G10L 25/72* (2013.01)
(Continued)

(52) U.S. Cl.
CPC .............. *G10L 25/30* (2013.01); *G10L 25/18* (2013.01); *G10L 25/51* (2013.01); *G10L 25/72* (2013.01)

(58) Field of Classification Search
CPC ......... G10L 25/30; G10L 25/18; G10L 25/51; G10L 25/72
(Continued)

(56) References Cited

U.S. PATENT DOCUMENTS 9,788,777 B1 * 10/2017 Knight .................... G10L 25/63
2009/0097664 A1 * 4/2009 Archibald .............. H04R 3/002
381/56

(Continued)

FOREIGN PATENT DOCUMENTS

DE    20 2013 007 042 U1    1/2014
EP              3430620 A1 *    1/2019    ........... G06F 16/683

OTHER PUBLICATIONS

D. Carmel, A. Yeshurun and Y. Moshe, "Detection of alarm sounds in noisy environments," 2017 25th European Signal Processing Conference (EUSIPCO), 2017, pp. 1839-1843, doi: 10.23919/EUSIPCO.2017.8081527. (Year: 2017).*

(Continued)

*Primary Examiner* — Bharatkumar S Shah
(74) *Attorney, Agent, or Firm* — Maginot, Moore & Beck LLP (57) ABSTRACT

A method is for the classification of temporally sequential digital audio data that describe acoustic signals that identify hazardous situations. The method includes calculating a large number of frequency spectrograms for stepwise progressive time intervals of the temporally sequential audio data, and forming a specific number of frequency segments for each octave of each individual frequency spectrogram. The frequency segments include a subset of the individual frequency spectrograms. The method further includes adding corresponding frequency segments of the octaves of each individual frequency spectrogram, calculating frequency components through the formation of mean values for the individual, added frequency segments in each individual frequency spectrogram, and generating a classification vector using a classifier and the number of frequency components of the large number of frequency spectrograms. The classifier is configured to classify signals, described by (Continued)

the associated temporally sequential digital audio data, that identify hazardous situations.

15 Claims, 2 Drawing Sheets

(51) Int. Cl.
　　*G10L 25/51*　　　　(2013.01)
　　*G10L 25/18*　　　　(2013.01)
(58) Field of Classification Search
　　USPC .......................................................... 704/232
　　See application file for complete search history.

(56) References Cited

U.S. PATENT DOCUMENTS

| | | | |
|---|---|---|---|
| 2010/0126332 A1 | 3/2010 | Kobayashi | |
| 2019/0103005 A1* | 4/2019 | Gilberton | ............ G10L 21/0224 |

OTHER PUBLICATIONS

A. Chittora, H. A. Patil and H. B. Sailor, "Spectro-temporal analysis of HIE and asthma infant cries using auditory spectrogram," 2015 International Conference on BioSignal Analysis, Processing and Systems (ICBAPS), 2015, pp. 145-150, doi: 10.1109/ICBAPS.2015.7292235. (Year: 2015).*

D. Carmel, A. Yeshurun and Y. Moshe, "Detection of alarm sounds in noisy environments," 2017 25th European Signal Processing Conference (EUSIPCO), 2017, pp. 1839-1843, doi: 10.23919/EUSIPCO.2017.8081527. (Year: 2017) (Year: 2017).*

A. Chittora, H. A. Patil and H. B. Sailor, "Spectro-temporal analysis of HIE and asthma infant cries using auditory spectrogram," 2015 International Conference on BioSignal Analysis, Processing and Systems (ICBAPS), 2015, pp. 145-150, doi: 10.1109/ICBAPS.2015.7292235. (Year: 2015) (Year: 2015).*

* cited by examiner

METHOD FOR THE CLASSIFICATION OF TEMPORALLY SEQUENTIAL DIGITAL AUDIO DATA

This application claims priority under 35 U.S.C. § 119 to patent application no. DE 10 2019 205 543.5, filed on Apr. 17, 2019 in Germany, the disclosure of which is incorporated herein by reference in its entirety.

The disclosure relates to a method for the classification of digital audio data that describe acoustic signals that identify hazardous situations as they occur, for example, in road traffic.

BACKGROUND

Until now, no systems with the recognition of special signals have been in use in road traffic, since the practical application necessitates a system with a high sensitivity that must ensure classification of the sound signals in road traffic according to the presence of special signals with a negligibly small number of false alarms. This is because the use of such a system in road traffic can only be justified when the error rate is very close to zero in order to avoid an unnecessary or even incorrect reaction of the vehicle such as, for example, driving through a red traffic light with the associated delays in the road traffic. Such a system should, moreover, be able to distinguish between the various special signals used around the world.

SUMMARY

The disclosure discloses a method for the classification of temporally sequential digital audio data that describe acoustic signals that identify hazardous situations, as well as a computer program, a computer-readable storage medium, and a decision system in accordance with the features disclosed herein.

It is important for driver assistance systems, and also however in the field of at least partially automatic driving, to recognize emergency vehicles with special signals and traffic police with acoustic signal transmitters in accordance with the statutory specifications in different countries. Other acoustic signals that identify hazardous situations such as, for example, calls for help or the warning signals of other vehicles, should also be recognized in order to be able to initiate an appropriate, possibly automatic, action or to be able to inform a vehicle driver of the situation.

In addition, an at least partially automatically driving vehicle with acoustic special signal recognition offers the advantage that, in cases in which there is still no direct visual contact with a special vehicle or with a traffic police officer, the identification of such an audio signal makes an early assessment of the situation possible both for a vehicle driver as well as for a partially automatic system, in order to be able to react appropriately.

When approaching a traffic junction with poor visibility or in an emergency, it is possible for an at least partially automatic vehicle, by means of appropriately categorized audio signal information, to select a suitable driving path in good time in order to give way to the emergency vehicle. Alternatively, when an application of a recognition system in the field of at least partially automatic driving is not involved, an appropriate notification can be given to the driver when a special signal is recognized. This would be highly advantageous in the case of a driver assistance system for people with limited hearing capacity, but, due to a greater sensitivity, can also be advantageous for all vehicle drivers due to a sound transducer attached, if possible, outside the interior.

The special rights of emergency vehicles require another involved vehicle to give way, perhaps by forming an emergency lane or driving into a forbidden region of the crossing. A suitable driving path must, in other words, be identified. Different signals are, however, used in different countries as special signals, for example the "Follow!" signal ("Martin's horn") in Germany or the "wail", "yelp" or "rumbler" in the USA.

The disclosure is based on the recognition that in the identification of, in particular, special signals and other acoustic signals that identify hazardous situations in the acoustic situation of road traffic, an analysis of the overtones associated with a fundamental tone often improves an identification of the signal that is to be determined and, in particular acoustic situations, the overtones are perceptible even more markedly than the associated fundamental tone against the background noise.

Acoustic signals that identify hazardous situations play an important role in road traffic in particular, since every traffic participant must react to such a signal, in accordance with the road traffic situation in which he finds himself. The special signals of emergency vehicles are an important example of such signals, and are typically implemented as special sirens generating different tone sequences which are also regionally specific. The "Martin's horn" tone sequence, described as "Ta-Tu-Ta-Ta", consisting of two fundamental tones (between about 360 Hz and 630 Hz) within 3.0+/−0.5 s, as well as the wail, yelp and rumbler are examples of such special signals, but these must be distinguished from other pitch sequences (change of constant notes), spurious siren signals that originate, for example, from toys or smartphones, and stationary sirens (civil defense sirens). Further examples include honks that can originate from different types of vehicle such as passenger cars, trucks, trains or trams. Acoustic signals from traffic police such as a policeman's whistle, the acoustic alarm signals at a level crossing, the acoustic warning signal of a reversing vehicle and acoustic signals from car alarms are also relevant for traffic participants. Cries for help or other calls such as "Stop" or "Fire" in different languages must be considered, and may have to be distinguishable from normal talk or music.

Such acoustic signals that identify hazardous situations can be converted by means of one or a plurality of sound transducers such as, for example microphones, into electric signals, wherein the sound transducer can in most cases be acoustically directly coupled to a sound environment that is to be monitored, for example a road traffic situation. Sound transducers that are, for example, arranged outside a driver's cab have the advantage over an arrangement in the interior of the vehicle that the acoustic signals are not damped by the cabin boundaries, and are thus more directly coupled to the sound environment.

Temporally sequential digital audio data can be generated, for example by means of an electronic analog-to-digital converter circuit, from such electric signals of the sound transducers, and these data then contain signals that identify the corresponding hazardous situations in digitally encoded form.

The analog-to-digital conversion of the electrical signals can be carried out here in such a way that acoustic signals that identify a hazardous situation include a relevant frequency range from, for example, 250 Hz up to 8 kHz, and thus the electrical signals are acquired by means of a sampling rate at twice the highest frequency to be acquired, and are thus converted into digital audio data. A higher sampling rate can increase the accuracy of the conversion.

The steps described above for the provision of digital audio data that describe acoustic signals that identify hazardous situations serve primarily for explanation, introduction and definition of the terms.

The method according to the disclosure for the classification of temporally sequential digital audio data that describe acoustic signals that identify hazardous situation calculates, in one step of the method, a large number of frequency spectrograms for stepwise progressive time intervals of the temporally sequential audio data.

The frequency spectrograms are calculated for stepwise progressive time intervals of the temporally sequential time intervals, i.e. offset to later times, of the digital audio data, wherein the calculation of the frequency spectrograms can be carried out with a large number of alternative methods. One exemplary method is what is known as the short-time Fourier transform (STFT), and another possible method is what is known as the wavelet transform. These methods are explained in more detail further below. A frequency spectrum results from this calculation, i.e. an amplitude of the frequency components of the acoustic signals described by the digital audio data against the frequency.

These stepwise progressive time intervals can, in accordance with the method of the disclosure, overlap in time. A high degree of overlap in the time intervals leads to a representation of frequency spectra, that is of frequency spectrograms of the digital audio signal against time, with a high time resolution.

As an example, the calculation of frequency spectrograms can be calculated by means of a short time Fourier transform with $2$ to the power $11=2048$ digital audio samples, but the expert understands that a large number of other values of audio samples are possible here. If the digital audio signal is generated with a 10 kHz sampling rate, these data cover a time interval of 0.2048 seconds, and a highly accurate detection with, at the same time, a low latency results if the time intervals are advanced in time steps of 0.1 seconds. The time intervals here mutually overlap by about 50%. Depending on the signal to be detected, the accuracy required and the latency time for the classification, the time steps can also be adjusted, for example, in the range from, for example, 0.05 seconds up to, for example, 0.2 seconds, and the overlap can also be selected to be larger or smaller. With time intervals having a step width of 0.05 seconds, the increased time resolution results in an increased classification performance for rapidly changing signals such as, for example, the "yelp".

The large number of frequency spectrograms can, for example, comprise 28 frequency spectrograms so that, with a time interval of 0.1 seconds, a time range of about 3 seconds is covered in each case, which, with a repetition frequency of, for example, the "Follow!" signal of 3 seconds, is oriented toward a detection of a particularly important signal, the special "Follow!" signal of emergency vehicles, in order to be able to evaluate characteristic time variations of this signal. These values, mentioned by way of example, can easily be adjusted to other classification tasks.

In a further step of the method, the individual frequency spectrograms are divided into octaves, i.e. ranges of the frequency whose final frequency is twice that of the initial frequency. Within each octave, a specific number of frequency segments of each individual frequency spectrogram is formed, wherein the frequency segments comprise a subset of the individual frequency spectrograms. The specific number of frequency segments can, for example, be $12$, but any other number of divisions that is particularly favorable for the later evaluation of the acoustic signals to be identified, for example, through classification, can be selected. The division can here also be divided in accordance with multi-rate filter banks or according to other binning strategies in which, for example, wider segments are used at higher frequencies.

The corresponding frequency segments of each individual frequency spectrogram of the different octaves are added together in a further step of the method according to the disclosure. The frequency segments are present in all octaves of the frequency spectrograms, are sorted in accordance with rising frequencies into the associated octaves, and can be distributed with equal portions over the respective octave. The frequency segments of one octave are thus sorted corresponding to the frequency segments of another octave, which are sorted in the same way in their octave.

The effect of this is that, in the case of harmonically constructed signals, the overtones that belong to a fundamental tone are added to the signal proportion of the fundamental tone, and thus adopt a higher value that stands out more easily from a background noise, for example a traffic situation. If a fundamental tone is not markedly present in the audio data, the signal that is to be detected can be identified on the basis of the often markedly present overtones.

Through the formation of mean values for the individual, added frequency segments in each individual frequency spectrogram, frequency components are calculated in a further step of the method.

The result of this is that, through the stepwise reduction in the amount of data that are to be handled, as well the further processing of the data being simplified, small variations in the frequency of the signal to be identified that is described by the digital audio data, the quality of the data for the identification and classification is not impaired, or noise components are suppressed for the evaluation. Differences or the variability of the signal to be identified resulting, for example, from different types of generators for special signals that are based, for example, on pneumatic or electric operating principles, as well as the multiple overlay of signals to be identified, are minimized by this method, which significantly reduces the complexity of a classification task.

In a further step of the method, a classification vector is generated by means of a classifier and the number of frequency components of the large number of frequency spectrograms. For this purpose the classifier is configured to classify signals, described by temporally sequential digital audio data, that identify hazardous situations by means of the associated number of frequency components of the large number of frequency spectrograms, and to assign corresponding values to the classification vector of the classification.

With the described method according to the disclosure, a high sensitivity, i.e. range, is thus achieved for the identification of acoustic special signals and for other acoustic signals that identify a hazardous situation, which brings about a significantly earlier identification of these signals.

Since it is possible by means of this method to elevate the signal that is to be detected from the acoustic environment, a low error rate results that results from the specific signal processing, in particular from the overlay of the frequency segments together with specific, defined, classifiers. This is because, for example, regionally invalid siren types do not trigger an unnecessary and incorrect reaction of a system when recognizing special signals, and a disturbance to the flow of traffic can be reduced to a minimum. This method thus identifies, for example, an acoustic special signal, and distinguishes between the different special signal types.

According to one embodiment of the method, it is proposed that the frequency segments of the number of frequency segments for each octave of each individual frequency spectrogram are arranged within an octave in such a way that the frequency segments at least partially mutually overlap. Such an overlapping can also occur with frequency segments that were previously convolved with a distribution function, so that the contributions from the overlapping regions with other segments are less noticeable, even if the overlap region is large in terms of frequency.

The incorporation of a larger frequency range achieved in this way can bring about a more robust classification and a better signal-to-noise ratio.

According to a further embodiment of the method, it is proposed that the temporally sequential digital audio data are analyzed for the presence of fundamental tones and overtones, and frequencies in a frequency band around these fundamental tones and overtones are attenuated in the audio data before the large number of frequency spectrograms for stepwise progressive time intervals of the temporally sequential audio data are calculated.

As a result of this preprocessing of the audio data, the audio data has an improved signal-to-noise ratio in respect of, in particular, special signals, e.g. of emergency vehicles, and thus can be classified more robustly.

For example, frequency bands of a specific width around a fundamental frequency and the first three harmonics of the fundamental frequency can be filtered out of the audio signal. This means that frequency components outside these frequency bands are attenuated in order to filter out the said frequency bands.

The identification of fundamental frequencies and/or overtones in the audio signal can be carried out with a range of analytical methods. Some methods that illustrate corresponding features of embodiments of the method are mentioned below by way of example.

The pitch detection, or the analysis of the fundamental frequency, examines a time signal by means of an autocorrelation calculation of the audio signal for the presence of a prominent signal component. The filtering or reduction of the frequency components outside the identified frequency bands can then be carried out by means of bandpass filters.

Cepstrum analysis is a method based on the Fourier transform. The calculation is done using the complex logarithms of the Fourier transform and subsequent inverse Fourier transform. The frequency components outside the identified frequency bands can be filtered by means of a bandpass filter.

The spectral flatness can be applied in particular to the special signals that are to be classified due to their high spectral energy density only in isolated, discrete frequencies. Only such frequency components as represent a peak in the frequency spectrum are retained here, while all others are filtered out. The "spectral flatness" is a measure for the "peakiness"/tonality, and is calculated as: spectral flatness= (geometric mean of the power spectrum)/(arithmetic mean of the power spectrum). An additional step for filtering is no longer necessary here.

An "adaptive spectral subtraction" filter represents an adaptive filter that can adjust its filter behavior. In the presence of a particularly marked noise background, the filter can be adapted to the current data and the background suppressed more strongly.

At regular intervals of time and frequency, the background in the spectrum, such as for example a flat background underneath the tone-like/peak-like frequency components, such as, for example, the "Ta-Tu-Ta-Ta" of the Martin's horn, are calculated here and subtracted from the total spectrum.

A further possibility for preprocessing is the use of an autoencoder neural network that learns patterns in order to generate compressed, or noise-free representations of the input data by extracting in our case audio signals from general background in accordance with the significant features.

"Autoencoder" refers to an artificial neural network KNN that makes it possible to learn specific patterns contained in the input data. Auto encoders are used to generate a compressed, or noise-free representation of the input data extracting in our case audio signals from general background in accordance with the significant features, such as specific classes.

The autoencoder uses three or more layers:

an input layer such as, for example, a two-dimensional image multiple significantly smaller layers that form the encoding to reduce the data an output layer whose dimension corresponds to that of the input layer, i.e. each output parameter in the output layer has the same significance as the corresponding parameter in the input layer.

According to a further embodiment of the method, it is proposed that the calculation of the large number of frequency spectrograms for stepwise progressive time intervals of the temporally sequential audio data is performed by means of a short-time Fourier transform or a wavelet transform.

The time-limited or short-time Fourier transform (STFT) is a procedure that yields Fourier information for non-stationary data. An evaluation window (Hanning window) is applied to the digital audio data under consideration, and reduces the beginning and the end of the audio data to the value zero in order to reduce a leakage effect and to increase the time resolution. Each individual fast Fourier transform (FFT) is here assigned to the point in time that corresponds to the middle of the window. The short-time Fourier transform with window function has a fixed frequency-time resolution.

In the wavelet analysis, which is similar to the STFT, time-limited "wave packet" functions are employed instead of infinitely extended sine/cosine functions. The term "wavelet transform" (WT) refers to a family of linear time-frequency transforms. The WT is comprised here of what is known as wavelet analysis, i.e. the conversion from the time domain to the spectral domain, and wavelet synthesis, i.e. the reverse transform of the wavelet transform into the time domain. The wavelet transform has a high frequency resolution at low frequencies, but a low temporal localization. At high frequencies it has a low frequency resolution but a good temporal localization.

The calculation of the frequency spectrograms with the short time Fourier transform has the advantage in particular of carrying out the calculation of the Fourier transform particularly quickly.

In one embodiment of the method it is proposed that the frequency components of each individual frequency spectrogram are normalized before the generation of the classification vector.

In a further embodiment of the method it is proposed that the frequency components of each individual frequency spectrogram are normalized to the value one.

The advantage of the normalization is that even less intense acoustic signals that initially only stand out a little against the noise of the digital audio data can be elevated out of the background through a normalization for the classifier.

In one variation of an embodiment of the method it is proposed that the frequency components of each individual frequency spectrogram are calculated by means of a histogram equalization method. Here, scalar values such as the grey or color value of an image that occur rarely are amplified while those that occur particularly frequently are attenuated. In comparison with a simple normalization to the maximum, the histogram equalization method makes it possible to emphasize and amplify contrasts or structures in the data in a targeted manner.

According to a further embodiment of the method it is proposed that the classifier comprises an artificial neural feed-forward network that is configured and trained to classify signals, described by temporally sequential digital audio data, that identify hazardous situations by means of the number of frequency components of the large number of frequency spectrograms by generating values of the classification vector.

A classification of special signals can be done by means of an artificial neural network (ANN). ANNs here consist of networks of artificial neurons that correspondingly recreate the biological model, namely the networking of neurons in nervous systems or the brain.

A neural network makes a framework available for many different algorithms for machine learning, for cooperating and for processing complex data inputs. Such neural networks learn to execute tasks on the basis of examples, typically without being programmed with task-specific rules.

Such a neural network is based on an assembly of linked units or nodes that are referred to as artificial neurons. Each connection can transmit a signal from one artificial neuron to another. An artificial neuron that receives a signal can process it and then activate other artificial neurons connected to it.

In conventional implementations of neural networks, the signal at a connection between artificial neurons is a real number, and the output of an artificial neuron is calculated as a non-linear function of the sum of its inputs. The connections between the artificial neurons typically have a weight that is adjusted as learning proceeds. The weight increases or reduces the strength of the signal at a connection. Artificial neurons can have a threshold, so that a signal is only output if the total signal exceeds this threshold. Typically, a large number of artificial neurons are assembled in layers. It is possible for different layers to carry out different types of transformation for their inputs. Signals move from the first layer, the input layer, to the last layer, the output layer, possibly after passing through the layers multiple times.

The architecture of the artificial neural feed-forward network can be an architecture that is configured in such a way that it receives a single data pattern, corresponding to an image, at its input stage and makes an output classification vector available that contains the probability of recognition for each class of interest.

According to a further embodiment of the method, it is proposed that the classifier comprises a multi-layer perceptron (MLP) that is configured and trained to classify signals, described by temporally sequential digital audio data, that identify hazardous situations by means of the number of frequency components of the large number of frequency spectrograms by generating values of the classification vector.

A network such as this belongs to the family of feed-forward artificial neural networks. Fundamentally, MLPs consist of at least 3 layers of neurons: an input layer, an intermediate (hidden) layer, and an output layer. This means that all the neurons of the network are distributed in layers, wherein one neuron of a layer is always connected to all the neurons of the next layer. There are no connections to the previous layer, and no connections that bypass a layer. Apart from the input layer, the different layers consist of neurons that are subject to a non-linear activation function and are connected to the neurons of the next layer.

According to a further embodiment of the method it is proposed that the classifier comprises an artificial neural feedback network that is configured and trained to classify signals, described by temporally sequential digital audio data, that identify hazardous situations by means of the number of frequency components of the large number of frequency spectrograms by generating values of the classification vector. A recurrent neural network (RNN) is a neural network which, in contrast to the feed-forward networks, also has connections from neurons of one layer to neurons of the same or of a preceding layer. This structure is particularly suitable for discovering time-coded information in the data.

According to a further embodiment of the method, it is proposed that the classifier comprises an artificial neural convolutional network that is configured and trained to classify signals, described by temporally sequential digital audio data, that identify hazardous situations by means of the number of frequency components of the large number of frequency spectrograms by generating values of the classification vector.

In addition to the explanations about the feed-forward neural network above, the design of an artificial convolutional neural network consists of one or a plurality of convolutional layers, followed by a pooling layer. The sequence of layers can be used with or without normalization layers (e.g. batch normalization), zero-padding layers, dropout layers and activation functions such as, for example, rectified linear unit ReLU, sigmoid function, tan h function or softmax function. These units can, in principle, be repeated as often as desired, and with enough repetitions these are then known as deep convolutional neural networks. After a number of repeated blocks consisting of convolutional and pooling layers, the CNN is concluded with one (or a plurality) of fully connected layers, similar to the architecture of the MLP.

The architecture of such neural convolutional networks is typically constructed of two parts. The first part is a sequence of layers that downsample the input grids to a lower resolution in order to obtain the desired information and to store the redundant information.

The second part is a sequence of layers that sample the output of the first part again in a fully connected layer and generate the desired output resolution such as, for example, a classification vector with the same length as the number of the signals that identify hazardous situations that are to be classified.

According to a further embodiment of the method, it is proposed that the classifier is configured to classify signals that identify hazardous situations by means of a section-by-section comparison of the number of frequency components of the large number of frequency spectrograms with a number of patterns and, depending on the result of the comparison, to assign different values to the classification vector.

The advantage of this simple approach is that, in contrast to ANNs, the way in which the algorithm works is clearly comprehensible here.

According to a further embodiment of the method, it is proposed that the classifier comprises a "support vector machine" SVM that is configured and trained to classify signals, described by temporally sequential digital audio data, that identify hazardous situations by means of the number of frequency components of the large number of frequency spectrograms by generating values of the classification vector.

This algorithm uses training data where the class to which they belong is known in each case, and can be used as a classifier as well as a regressor. SVMs here divide a quantity of data points/objects in an n-dimensional space into classes in such a way that a largest possible n-dimensional "region" remains free around the class boundaries. What is known as a hyperplane that separates the datasets of different classes from one another as effectively as possible is thus sought for.

According to a further embodiment of the method it is proposed that the classifier is a k-NN (k-nearest neighbor) classifier. This is a parameterless method with which probability density functions can be estimated. The class assignment is performed taking only the k nearest neighbors into account. In the simplest case, the classification takes place through a simple majority decision in which the k nearest objects are involved. An object xis assigned to the class that has the largest number of the objects of these k neighbors. A large number of measures of distance (such as, for example, Euclidean distance, etc.) may be considered for determining the k nearest neighbors. A k-NN classifier is trained for this purpose on the basis of data of known classes.

According to a further embodiment of the method it is proposed that the classifier comprises a pre-classifier and a main classifier, and that the pre-classifier is configured to identify signals, described by temporally sequential digital audio data, that identify hazardous situations by means of the number of frequency components of the large number of frequency spectrograms. The main classifier is configured to classify signals, described by temporally sequential digital audio data, that identify hazardous situations by means of the number of frequency components of the large number of frequency spectrograms through values of the classification vector if the pre-classifier has identified signals that identify hazardous situations in the temporally sequential digital audio data.

Since the pre-classifier has a less complex task to perform, the advantage emerges that the pre-classifier can identify whether a signal that identifies a hazardous situation is present at all more quickly and with less resources before the more complex task of the precise classification follows.

According to a further embodiment of the method, it is proposed that the classifier comprises a number of partial classifiers, each of which is only trained for one signal to be classified, and that the classification tasks operate in parallel. The partial classifiers can thus be highly specifically and individually trained and are more robust against incorrect classification. N classifiers are trained individually for this purpose, where N is the number of alternative classes. The individual "binary" classifiers can be combined in a variety of ways to form a total classifier. The final evaluation of the classification can then take place through the class with the highest probability out of the individual classifiers.

According to a further embodiment of the method, it is proposed that, depending on at least one of the values of the classification vector, a drive signal for driving an at least partially automatic vehicle and/or a warning signal for warning a vehicle occupant is output.

A longitudinal or transverse movement of the vehicle can, in particular, take place on the basis of the drive signal.

Such a drive signal can thus, for example, be supplied to a control unit or an actuator which can then respectively initiate processes such as, for example, a steering process, an acceleration process or a braking process.

On the basis of the warning signal a display unit can, for example, be operated in such a way that a vehicle occupant receives a notification of a future event, for example of the approach of an emergency vehicle, so that an appropriate action can be taken by the driver.

This embodiment of the method has the advantage that safety in road traffic is increased. On the one hand, emergency vehicles can move forward more quickly, and on the other hand accidents caused by emergency vehicles can be prevented.

An at least partially automated vehicle can in particular also refer to robots such as logistics and/or industrial robots. Mobile garden devices such as at least partially automatically operated lawnmowers or the like also fall under this definition.

The at least partially automated vehicle can also be another mobile robot, for example one that moves forwards by flying, swimming, diving or stepping. The mobile robot can, for example, also be an at least partially automatic cleaning robot.

In particular, these vehicles can be halted and/or fully switched off on the basis of a value of the classification vector. If, for example, on the basis of the classification vector, a hazard for a living being, in particular a person, is deduced, a corresponding drive serves to increase the operational safety of the corresponding vehicle. In the case of logistics, cleaning and/or mowing robots, accidents can in this way also be avoided, in particular involving employees, domestic pets and children.

In accordance with a further embodiment of the method, it is proposed that, depending on at least one of the values of the classification vector, a driving path for an at least partially automatic vehicle or for a driver assistance system is determined out of a large number of driving paths. In a driver assistance system, the determination would involve a suggestion to the driver. If, namely, a value of the classification vector indicates that an acoustic signal that identifies a hazardous situation has been identified, it is possible, depending upon a current traffic situation, to determine a driving path which, for example, helps to form a free lane, or, for example, a driving path with a reduced speed can be determined.

A computer program is proposed which comprises commands which, when the program is executed by a computer, cause it to carry out the above-described method.

A computer program comprises the program code in any desired programming language, a computer program, a compiled version of the program code, a firmware by means of which the program code is implemented or also a chip whose functionality reproduces the program code.

A machine-readable storage medium is also proposed, which comprises commands which, when executed by a computer, cause the latter to carry out the above-described method.

A machine-readable storage medium on which the computer program is stored is also proposed.

According to the disclosure, a device is specified that is configured to carry out one of the above-described methods.

The device can, in particular, be a control device, for example for an at least partially automatic robot, in particular for an at least partially automatic vehicle.

According to the disclosure, a decision system for a driving path of a vehicle is proposed that is configured to carry out one of the above-described methods and, depending on the value of the classification vector, to determine a driving path out of a large number of driving paths for a vehicle. Such a decision system can be provided in at least partially automatic vehicles as well as for use in a driver assistance system.

BRIEF DESCRIPTION OF THE DRAWINGS

Exemplary embodiments of the disclosure are presented with reference to the figures, and explained in more detail below. Here.

DETAILED DESCRIPTION

Figure 2:
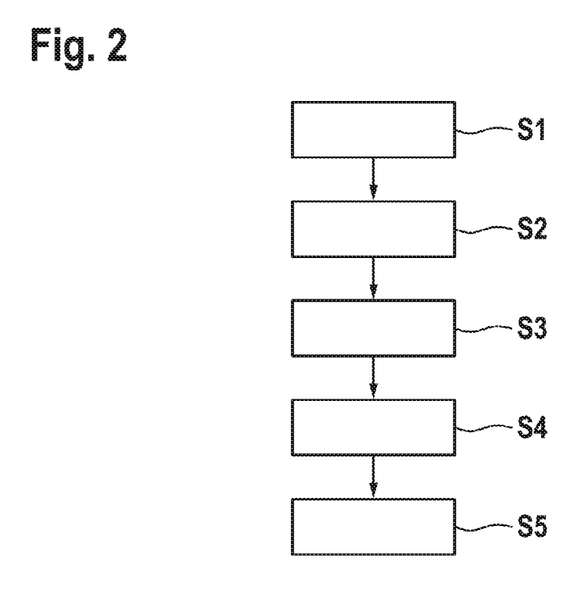
FIG. 2 shows a method for classifying acoustic signals.

The exemplary embodiment shows by way of example how the method according to the disclosure classifies three different temporally sequential digital audio data that describe different acoustic signals.

Here, in a first step S1, the temporally sequential digital audio data are transformed from the time domain into a frequency domain. This can, for example, be done using a short-time Fourier transform.

During the calculation of a large number of frequency spectrograms for stepwise progressive time intervals of the temporally sequential audio data, a time window of 0.2 seconds from the beginning of approximately three seconds of the temporally sequential digital audio data is converted by means of the short-time Fourier transform into the frequency domain with, for example, 2048 amplitude values, and a frequency spectrogram for this first time window is thus prepared. This time window is then advanced further forward in time by 0.1 seconds in order to carry out a further short-time Fourier transform and to form a second frequency spectrogram. These steps are repeated until the algorithm has reached the end of the approximately three seconds. This leads to a plurality of 28 frequency spectrograms for the approximately three seconds.

The frequency spectrograms are divided into their octaves, i.e. the frequency ranges in which the end of a region is formed by the double value of the frequency of the beginning of the region. Within each such octave, a specific number of frequency segments are formed S2 for each individual frequency spectrogram. This specific number can, for example, be 12. These frequency segments are, for example, arranged evenly and adjacently in the octave, and comprise a subset of each of the individual frequency spectrograms.

The values of the for example 12 frequency segments from the corresponding frequency segments, i.e. the segments that are arranged within the octaves at the same position, of the different octaves are added S3 to each individual frequency spectrogram. Then 12 added frequency segments are thus formed, of which in each case a mean value is formed, and frequency components thus calculated S4.

These 12 frequency components of the 28 frequency spectrograms are passed, for example as a 28×12 image, as an input value to a classifier which generates S5 a classification vector from them whose value classifies the signals, described by temporally sequential digital audio data, that identify hazardous situations by means of the number of frequency components of the large number of frequency spectrograms, and assigns corresponding values to the classification vector of the classification.

In this exemplary embodiment, the classifier comprises an artificial neural convolutional network that is configured and trained to classify signals, described by temporally sequential digital audio data, that identify hazardous situations by means of the number of frequency components of the large number of frequency spectrograms by generating values of the classification vector.

The artificial neural convolutional network here consists of a sequence of two blocks with convolution layers.

The first block comprises the following layers:
zero padding layer; scaling back the input with +1 in both image directions, convolutional layer with kernel number N1 (e.g. N1=16) 3×3 and stride 1, ReLU activation function,
zero padding layer; scaling back the input with +1 in both image directions, convolutional layer with kernel number N1 (e.g. N1=16) 3×3 and stride 1, ReLU activation function,
maximum pooling layer of size 2×2 and stride 2,
dropout layer.

Second block:
zero padding layer; scaling back the input with +1 in both image directions, convolutional layer with kernel number N1 (e.g. N1=16) 3×3 and stride 1, ReLU activation function,
zero padding layer; scaling back the input with +1 in both image directions, convolutional layer with kernel number N1 (e.g. N1=16) 3×3 and stride 1, ReLU activation function,
maximum pooling layer of size 2×2 and stride 2,
dropout layer.

A fully connected layer and a tightly connected output layer, with "softmax" activation function, are contained in order to complete the network model architecture. The dropout layers randomly switch some neurons in the neural network to silent in order to reduce the possibility of over-adaptation. The last layer has an output size that corresponds to the number of categories of signals that identify hazardous situations.

TABLE 1

| Layer (type) | Output form | Parameters # |
|---|---|---|
| zero padding2d 1 | (30, 14, 1) | 0 |
| conv2d 1 | (28, 12, 16) | 160 |
| zero padding2d 2 | (30, 14, 16) | 0 |
| conv2d 2 | (28, 12, 16) | 2320 |
| max pooling2d 1 | (14, 6, 16) | 0 |
| dropout 1 | (14, 6, 16) | 0 |
| zero padding2d 3 | (16, 8, 16) | 0 |
| conv2d 3 | (14, 6, 32) | 4640 |
| zero padding2d 4 | (16, 8, 32) | 0 |
| conv2d 4 | (14, 6, 32) | 9248 |
| max pooling2d 2 | (7, 3, 32) | 0 |
| dropout 2 | (7, 3, 32) | 0 |
| flatten 1 | (672) | 0 |

TABLE 1-continued

| Layer (type) | Output form | Parameters # |
|---|---|---|
| dense 1 | (64) | 43072 |
| dropout 3 | (64) | 0 |
| output node | (Number of classes) | (64 + 1) × number of classes |

Table 1 describes the layers in more detail.

The input is a 28×12×1 image or tensor data pattern

Suitable neural networks according to this disclosure are trained in that in an input layer a number of frequency components of a large number of frequency spectrograms are provided as training data, and the output data of the neural network are compared with the expected classifications. The parameters of the neural network are then modified until an agreement is sufficiently accurate (supervised learning).

Figure 1A:
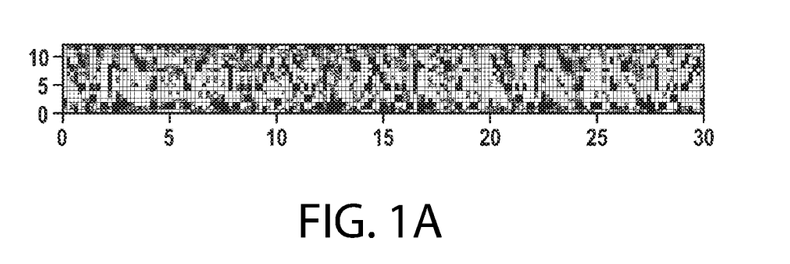
FIG. 1A shows a sequence of frequency components against time without a special signal.
Figure 1B:
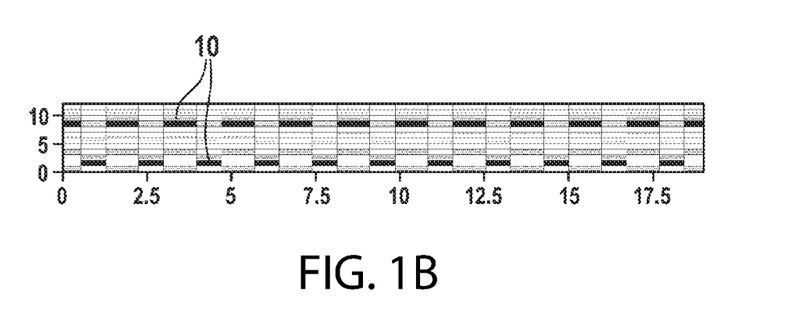
FIG. 1B shows a sequence of frequency components against time with a "Follow!" signal.
Figure 1C:
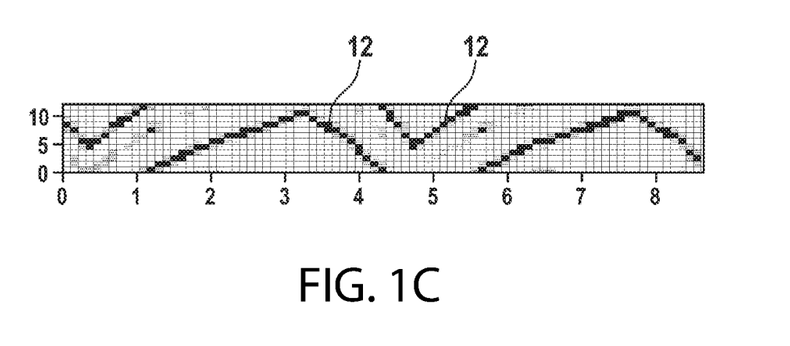
FIG. 1C shows a sequence of frequency components against time with a wail signal.

FIGS. 1A, 1B, and 1C show examples of input values that are passed to the classifier. In each case, the abscissa represents a time axis and the ordinate represents the 12 frequency components. Amongst the small partial areas 10, 12 of each figure, the black one is proportional to the height of the value of the frequency component.

FIG. 1A shows the values of the frequency components when no special signal is detected in the audio data. In FIG. 1B, the "Follow!" signal can be clearly recognized from the temporally changing frequency components with the highest amplitude 10. FIG. 1C shows a yelp special signal, in which the frequency components with maximum amplitude 12 pass through different members of the 12 frequency components as time progresses. It can clearly be recognized that the method is suitable for processing special signals from a traffic situation in such a way that the classification of these images with different classifiers is possible.

What is claimed is:

1. A method for classification of temporally sequential digital audio data that describe acoustic signals that identify hazardous situations, comprising:
    calculating a number of frequency spectrograms for stepwise progressive time intervals of the temporally sequential digital audio data;
    forming a specific number of frequency segments for each octave of each individual frequency spectrogram, wherein the frequency segments comprise a subset of the individual frequency spectrograms;
    adding corresponding frequency segments of the octaves of each individual frequency spectrogram;
    calculating a number of frequency components through formation of mean values for the individual, added frequency segments in each individual frequency spectrogram; and
    generating a classification vector using a classifier and the number of frequency components of the number of frequency spectrograms, the classifier configured to classify acoustic signals, described by the temporally sequential digital audio data, that identify the hazardous situations based on the number of frequency components of the number of frequency spectrograms, and the classifier configured to assign corresponding values to the classification vector of the classification.

2. The method according to claim 1, further comprising: arranging the frequency segments of the specific number of frequency segments for each octave of each individual frequency spectrogram within an octave in such a way that the frequency segments at least partially mutually overlap.

3. The method according to claim 1, further comprising:
    analyzing the temporally sequential digital audio data for the presence of fundamental tones and overtones; and
    attenuating frequencies in a frequency band around the fundamental tones and overtones in the temporally sequential digital audio data before calculating the number of frequency spectrograms for stepwise progressive time intervals of the temporally sequential digital audio data.

4. The method according to claim 1, further comprising: calculating the number of frequency spectrograms for stepwise progressive time intervals of the temporally sequential digital audio data using a short-time Fourier transform or a wavelet transform.

5. The method according to claim 1, further comprising: normalizing the frequency components of each individual frequency spectrogram before generating the classification vector.

6. The method according to claim 5, further comprising: normalizing the frequency components of each individual frequency spectrogram to the value one; or normalizing the frequency components of each individual frequency spectrogram using a histogram equalization method.

7. The method according to claim 1, wherein the classifier comprises an artificial neural feed-forward network configured and trained to
    classify the acoustic signals, described by the temporally sequential digital audio data, that identify the hazardous situations using the number of frequency components of the number of frequency spectrograms by generating the values of the classification vector.

8. The method according to claim 1, wherein the classifier comprises an artificial neural feedback network that is configured and trained to
    classify the acoustic signals, described by the temporally sequential digital audio data, that identify hazardous situations using the number of frequency components of the number of frequency spectrograms by generating the values of the classification vector.

9. The method according to claim 1, wherein the classifier comprises an artificial neural convolutional network that is configured and trained to
    classify acoustic signals, described by the temporally sequential digital audio data, that identify the hazardous situations using the number of frequency components of the number of frequency spectrograms by generating the values of the classification vector.

10. The method according to claim 1, wherein the classifier is configured to
    classify acoustic signals that identify the hazardous situations using a section-by-section comparison of the number of frequency components of the number of frequency spectrograms with a number of patterns and, depending on the result of the comparison, to assign different values to the classification vector.

11. The method according to claim 1, wherein:
    the classifier comprises a pre-classifier and a main classifier, and the pre-classifier is configured to
        identify acoustic signals, described by the temporally sequential digital audio data, that identify the hazardous situations using the number of frequency components of the number of frequency spectrograms, and the main classifier is configured to
- classify acoustic signals, described by the temporally sequential digital audio data, that identify the hazardous situations using the number of frequency components of the number of frequency spectrograms through the values of the classification vector when the pre-classifier has identified the acoustic signals that identify the hazardous situations in the temporally sequential digital audio data.

12. The method according to claim 1, further comprising:
outputting, depending on at least one of the values of the classification vector, a drive signal for driving an at least partially automated vehicle and/or a warning signal for warning a vehicle occupant.

13. The method according to claim 1, wherein a device is configured to carry out the method.

14. The method according to claim 1, wherein a computer program comprising commands which, when the computer program is executed by a computer, causes the computer to carry out the method.

15. The method according to claim 14, wherein the computer program is stored on a non-transitory computer-readable storage medium.

* * * * *